Patented Feb. 3, 1925.

1,524,995

UNITED STATES PATENT OFFICE.

CLARENCE A. NASH, OF CHICAGO, ILLINOIS, ASSIGNOR TO BAKELITE CORPORATION, OF NEW YORK, N. Y., A CORPORATION OF DELAWARE

PHENOLIC RESIN AND PROCESS OF MAKING THE SAME.

No Drawing.   Application filed May 7, 1924.   Serial No. 711,745.

*To all whom it may concern:*

Be it known that I, CLARENCE A. NASH, a citizen of the United States of America, residing at Chicago, in the county of Cook and State of Illinois, have invented certain new and useful Improvements in Phenolic Resins and Processes of Making the Same, of which the following is a specification.

As is well known in this art the phenolic resins (a term employed herein to designate resins prepared by the interaction of a phenol and a methylene-containing body such as formaldehyde, paraform, hexamethylenetetramine or the like) have a color varying usually from light yellow to brown or red according to the purity of the reagents, the nature of the condensing agents and other factors. For the manufacture of special products it is customary to incorporate dyes or pigments with these resins, or with compositions such as molding mixtures and the like, prepared therefrom. For example black resinuous products, or black molded articles, are prepared by the use of black dyes, or in some cases of black pigments, as carbon black or the like. In a similar manner other colors, as red, green, etc., may be produced. Such dyes or pigments have heretofore been incorporated with the resin or resin mixture before the final hardening operation.

I have found that special advantages, pertaining to the permanence, even distribution and quality of the color, are secured if the coloring matter or dyestuff is introduced into, or preferably developed in the raw materials, or one of them, before the synthesis of the resin. By proceeding in this way I have been able to secure a depth and homogeneity of color not otherwise attainable. In special cases there exists also a decided manufacturing advantage.

Following is a specific illustrative example of the invention as applied to the preparation of jet-black resins, for use either alone or in admixture with any of the usual fillers:

One molecular proportion or mol of phenol or cresol is mixed with a relatively very small proportion, say about one-twentieth of a mol, of furfuraldehyde, and an acid condensing agent (hydrochloric, sulfuric, oxalic acid or the like) is added in proportion of about 1% by weight of the mass. The mass is boiled thoroughly until it becomes inky black, whereupon the requisite amount of formaldehyde is added (preferably about 0.6 mol) and the boiling continued until a jet-black resin of the permanently fusible and soluble type results.

This resin, aside from its jet-black appearance, possesses all of the characteristics of the so-called non-reactive phenolic resins, and is further utilized in any of the ways familiar to those skilled in this art. Thus, it may be dissolved in alcholic or other solvents and used as a varnish resin; or hexamethylenetetramine may be added to the resin, either before or after its solution, forming potentially reactive varnishes. Similarly hexamethylenetetramine or other methylene-containing hardening agents may be incorporated with the non-reactive resin to impart to it the potentially reactive character; and the resulting potentially reactive resin may be applied in all of the usual ways, either unmixed, or incorporated with fibrous or other fillers as a molding compound, etc. Or instead of preparing in the first instance a non-reactive resin, a reactive resin may be made as the initial condensation product by increasing the proportion of methylene reagent to approximately the equi-molecular ratio to the phenol, using preferably a basic condensing agent, as is now well understood in this art.

I believe myself to be the first to have prepared artificially colored phenolic resins, whether of the non-reactive or reactive types, by a process in which the coloring matter or dye is introduced into or developed in the mass as a step precedent to the synthesis of the resin: and to have demonstrated the technical value of such procedure. Any dye or coloring matter not injuriously affected by the other components of the mixture may of course be developed or introduced therein in accordance with my invention. While I prefer to develop or synthesize the coloring matter in presence of the phenolic body as described in the above specific example, I regard it as within my invention to introduce a preformed dye or dyestuff into the mass, at any operating stage preceding the synthesis of the reactive or non-reactive resin.

The use of furfuraldehyde as the basis or intermediate of a coloring matter, as described in the foregoing specific example is to be clearly distinguished from the known use of furfuraldehyde as an aldehyde hardening agent for phenolic resins. According to the present invention the proportion of furfuraldehyde used is too small to enable it to react with the phenolic body to yield a resin, or to harden a phenolic resin otherwise prepared.

I claim:

1. Process of preparing homogeneously-colored phenolic resin compositions, comprising synthesizing the phenolic resin in presence of a coloring matter.

2. Process of preparing homogeneously-phenolic resin compositions, comprising developing a coloring matter in presence of a phenolic body, and thereafter preparing a phenolic resin from said phenolic body.

3. Process of preparing black phenolic resin compositions, comprising developing a black coloring matter by reaction of a phenolic body and furfuraldehyde, the latter in less than resin-forming proportions, and thereafter preparing a phenolic resin from said phenolic body.

4. A black phenolic resin composition comprising the reaction product of a phenolic body, a methylene-containing reagent, and furfuraldehyde, the furfuraldehyde being combined with the phenolic body in less than resin-forming proportions.

In testimony whereof, I affix my signature.

CLARENCE A. NASH.